(12) United States Patent
Jiang et al.

(10) Patent No.: US 10,628,133 B1
(45) Date of Patent: Apr. 21, 2020

(54) CONSOLE AND METHOD FOR DEVELOPING A VIRTUAL AGENT

(71) Applicant: Rulai, Inc., Campbell, CA (US)

(72) Inventors: Tony Yong She Jiang, Sunnyvale, CA (US); Thi T. Avrahami, Mountain View, CA (US); Jie Li, Cupertino, CA (US); Xing Yi, Milpitas, CA (US)

(73) Assignee: RULAI, INC., Campbell, CA (US)

( * ) Notice: Subject to any disclaimer, the term of this patent is extended or adjusted under 35 U.S.C. 154(b) by 0 days.

(21) Appl. No.: 16/407,648

(22) Filed: May 9, 2019

(51) Int. Cl.
| | | |
|---|---|---|
| G06F 9/44 | (2018.01) | |
| G06F 8/34 | (2018.01) | |
| G06F 3/0485 | (2013.01) | |
| G06F 3/0482 | (2013.01) | |
| H04L 12/58 | (2006.01) | |
| G10L 15/18 | (2013.01) | |
| G06F 40/35 | (2020.01) | |
| G10L 21/00 | (2013.01) | |
| G10L 15/26 | (2006.01) | |
| G10L 15/22 | (2006.01) | |

(52) U.S. Cl.
CPC .............. *G06F 8/34* (2013.01); *G06F 3/0482* (2013.01); *G06F 3/0485* (2013.01); *G10L 15/1815* (2013.01); *G10L 15/1822* (2013.01); *H04L 51/02* (2013.01); *G06F 40/35* (2020.01); *G10L 15/22* (2013.01); *G10L 15/26* (2013.01); *G10L 21/00* (2013.01)

(58) Field of Classification Search
CPC .. G06F 8/10; G06F 8/34; G06F 40/35; G06Q 10/107; H04M 7/0045; G10L 15/22; G10L 15/26; G10L 15/1815; G10L 15/1822; G10L 21/00
See application file for complete search history.

(56) References Cited

U.S. PATENT DOCUMENTS

| | | |
|---|---|---|
| 6,272,216 B1 | 8/2001 | Vaios |
| 6,366,300 B1 | 4/2002 | Ohara et al. |

(Continued)

FOREIGN PATENT DOCUMENTS

WO 2015006246 A1 1/2015

OTHER PUBLICATIONS

"PCT Search Report and Written Opinion, PCT/IB2017/055939, dated Jan. 26, 2018", Jan. 26, 2018.

(Continued)

*Primary Examiner* — Tuan A Vu
(74) *Attorney, Agent, or Firm* — Edward C. Kwok; VLP Law Group, LLP

(57) ABSTRACT

A design console provides interaction with a developer in a graphical interface of a virtual agent programming system where elements of an intended dialog between the virtual agent and a chat (developer) user are shown as dialog boxes in the graphical interface, including a trigger element which processes and detects from the input messages processed an intent by the chat user to invoke the virtual agent based on one or more stored utterances; an interaction module which sends a virtual agent message to the chat user, and receives therefrom an utterance responsive to the virtual agent message; and an action element that carries out a specified user intent based on the values of the parameters converted by the interaction module from the utterance collected from the chat user.

42 Claims, 12 Drawing Sheets

(56) References Cited

U.S. PATENT DOCUMENTS

| | | | |
|---|---|---|---|
| 6,393,460 B1* | 5/2002 | Gruen | G06Q 10/107 709/204 |
| 10,033,870 B1* | 7/2018 | Koster | H04M 7/0045 |
| 2008/0016505 A1 | 1/2008 | Bucklew et al. | |
| 2008/0031357 A1 | 12/2008 | Bushey et al. | |
| 2012/0265528 A1 | 10/2012 | Gruber et al. | |
| 2014/0074483 A1 | 3/2014 | Van Os | |
| 2014/0297268 A1 | 10/2014 | Govrin et al. | |
| 2015/0186155 A1 | 7/2015 | Brown et al. | |
| 2015/0186156 A1 | 7/2015 | Brown et al. | |
| 2015/0213140 A1 | 7/2015 | Volkert | |
| 2016/0212488 A1 | 7/2016 | Van Os et al. | |
| 2017/0206095 A1* | 7/2017 | Gibbs | G06F 3/011 |
| 2017/0324868 A1 | 11/2017 | Tamblyn et al. | |
| 2018/0024814 A1* | 1/2018 | Ouali | G06F 8/10 717/105 |
| 2018/0137854 A1* | 5/2018 | Perez | G10L 15/22 |

OTHER PUBLICATIONS

"PCT Search Report and Written Opinion, PCT/US2018/032753", dated Jul. 30, 2018.

* cited by examiner

CONSOLE AND METHOD FOR DEVELOPING A VIRTUAL AGENT

CROSS REFERENCE TO RELATED APPLICATIONS

The present application is related to U.S. patent application ("Copending Application"), Ser. No. 15/677,275, entitled "Method and System for Collaborative Intelligent Virtual Agents," filed on Aug. 15, 2017. The disclosure of the Copending Application is hereby incorporated by reference herein in its entirety.

BACKGROUND OF THE INVENTION

1. Field of the Invention

The present invention relates to an efficient user interface for development of a virtual agent. In particular, the present invention relates to providing such an interface

2. Discussion of the Related Art

The recent advances in the use of artificial intelligence in many commercial applications. Such commercial applications may be realized from well-designed general-purpose intelligent software modules by user customization. For successful deployment, however, such user customization cannot require the user to have the skills and sophistication of a software developer, which most customers of such software do not readily possess.

Furthermore, most application software today are deployed and used in mobile devices, such as mobile telephones. These mobile applications heavily rely on graphical user interfaces that are implemented on the screen, which both displays output and receives input through an underlying tactile device. Any tool that facilitates user customization to implement an application program on a mobile device should interact with the user in the context of that medium and should provide the user with a visualization of what the user interface to the customized software would look like in that medium. In the past art, without the visualization, the user is often asked to fill out questionnaires or forms which often result in requiring many unsuccessful attempts before a functional application is achieved.

A suitable programming interface or "design console" which interacts with the developer in the context of the intended device of application deployment, with support for visualization of the final product is greatly desired and needed.

SUMMARY

According to one embodiment of the present invention, a design console and a method provide interaction with a developer in a graphical interface of a virtual agent programming system. In the graphical interface, a graphical image of a target medium of presentation (e.g., a screen of a mobile device) shows elements of an intended dialog between the virtual agent and a chat user, including: (a) a trigger element representing a module which processes input messages from the chat user and which detects from the input messages processed an intent by the chat user to invoke the virtual agent based on one or more stored utterances; (b) one or more interaction elements, each interaction element representing an interaction module which (i) sends a virtual agent message to the chat user, (ii) receives from the chat user an utterance responsive to the virtual agent message, and (iii) determines the responsive utterance the value of a parameter of a specified user intent, wherein each interaction element is shown on the graphical image of the target medium of presentation as (i) a virtual agent utterance and (ii) a chat user utterance; and (c) an action element representing a module that carries out the specified user intent based on the values of the parameters collected from the chat user through the interaction module. The design console may provide graphical devices to allow the developer to edit the elements of the intended dialog, such as dialog boxes.

According to one embodiment of the present invention, the elements of the intended dialog represent a task flow, which is also further represented in the design console by a flow chart that is editable by the developer using graphical devices that are the same or similar to those provided for editing the elements of the intended dialog represented in the graphical image of the simulated target medium of presentation (e.g., a mobile device screen). The two simultaneous, alternative visual presentations (i.e., the mobile telephone screen and the flow chart) by the design console provide the developer a coordinated visual design environment, providing the attendant advantages of both approaches. Consequently, the develop may select, zoom into and edit with ease any element of the intended dialog concurrently in both the simulation view (e.g., the simulated mobile telephone screen) and the flow chart view, guided by activation and highlighting of the corresponding elements and in the context and perspective of the entire organization of the intended dialog and the related business logic.

According to one embodiment of the present invention, the design console allows testing by simulating the intended dialog and displaying utterances of the resulting simulated dialog.

The present invention is better understood upon consideration of the detailed description below in conjunction with the accompanying drawings.

DETAILED DESCRIPTION OF THE PREFERRED EMBODIMENTS

The present invention provides an efficient design console to a development system ("virtual agent development engine") that allows a developer to develop a virtual agent, such as a conversation virtual agent. The design console allows the developer to define user-virtual agent interactions using an expressive graphical user interface ("GUI"). The user-virtual agent interactions defined using the design console may be implemented on any target medium of user interaction ("end product"), such as on an interactive screen of a mobile device or on any user interface running on any computing device.

Figure 1:
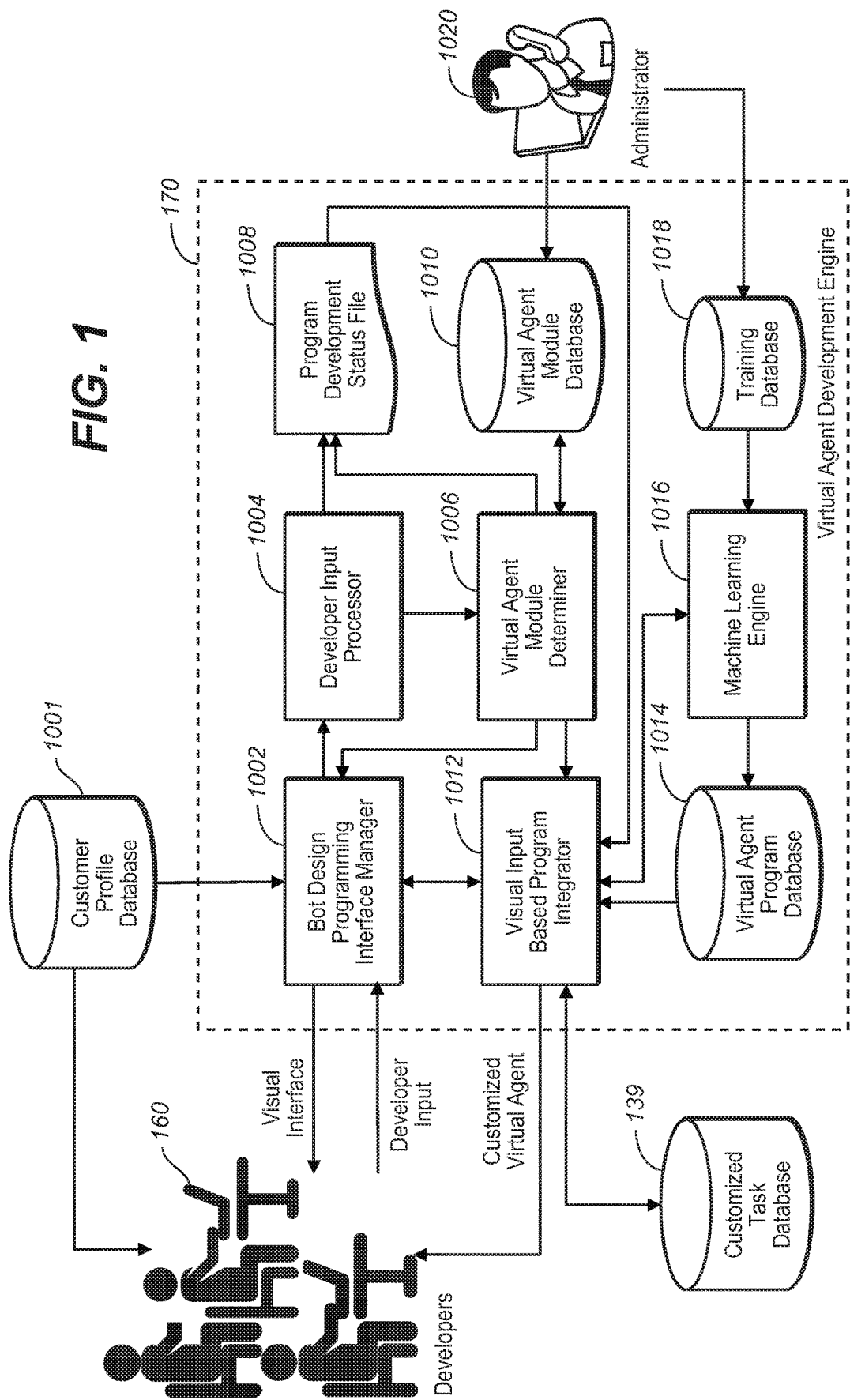
FIG. 1 is an exemplary diagram of virtual agent development engine 170 disclosed in the Copending Application.

In this detailed description, merely for the purpose of illustration, the present invention is illustrated by embodiments implemented in the context of previously described virtual agent development engine 170, which is reproduced herein in FIG. 1. FIG. 1 is an exemplary diagram of virtual agent development engine 170 of the Copending Application. As shown in FIG. 1, virtual agent development engine 170 a bot design programming interface manager 1002, a developer input processor 1004, a virtual agent module determiner 1006, a program development status file 1008, a virtual agent module database 1010, a visual input based program integrator 1012, a virtual agent program database 1014, a machine learning engine 1016, and a training database 1018. An efficient design console of the present invention may be presented by bot design programming interface manager 1002 to interact with developer 160. As discussed below, the design console provides a programming interface that may be used to customize virtual agents for different applications. For example, in one embodiment, the programming interface customizes task-oriented applications (i.e., each application may be customized to perform a specific task). Also, bot design programming interface manager 1002 may provide customized programming interfaces for different tasks.

FIG. 1 shows bot design programming manager 1002 accesses customer profiles in customer profile database 1001. In this context, the customer uses hot design programming manager 1002 to customize its virtual agents to serve the customer's business or businesses. Typically, the customizations are driven by the tasks the customer's virtual agents are expected to handle. FIG. 1 shows that bot-design programming interface manager 1002 draws on a customer's profile in customer profile database 1001 to initialize an environment that facilitates customizing a virtual agent for a specific application (e.g., data relevant to a virtual travel agent or data relevant to a virtual rental agent).

As discussed in the Copending Application, bot design programming interface manager 1002 may also draw on past dialogs to develop a virtual agent. For instance, archived dialogs—e.g., those accumulated in dialog log databases 212 of different virtual agents—may provide examples of different utterances that correspond to the same task. Bot design programming interface manager 1002 may recognize such utterances as alternative triggers to invoke the same virtual agent in development. Bot design programming interface manager 1002 may forward developer input to developer input processor 1004 for processing. As shown in FIG. 1, bot design programming interface manager 1002 may interact with multiple developers 160 at the same time, resulting in concurrent development of multiple customized virtual agents.

Developer input processor 1004 processes developer input to determine developer intent and instruction. For example, an input received from the developer may specify an interaction between the virtual agent under programming with a chat user to collect specific information or an order in which a group of selected actions is to be carried out by the virtual agent. Developer input processor 1004 may send each processed input to virtual agent module determiner 1006 for determining specific modules to be integrated into the virtual agent. Developer input processor 1004 may also store each processed input to program development status file 1008 to record or update the status of the virtual agent's program development.

Based on the processed input, virtual agent module determiner 1006 may determine the modules specified by the developer over the programming interface of the design console any customized virtual agent modules corresponding to the specified modules from virtual agent module database 1010. Virtual agent module determiner 1006 may send the retrieved virtual agent modules to bot design programming interface manager 1002 for review by the developer via the design console. Virtual agent module determiner 1006 may also store each retrieved virtual agent module to program development status file 1008 to record or update the status of the virtual agent's program development.

Virtual agent module determiner 1006 may determine some of the modules selected by the developer for further customization. For each determined module, virtual agent module determiner 1006 may determine at least one parameter of the module based on input from the developer. For example, for a module that corresponds to sending an utterance to a chat user, virtual agent module determiner 1006 may send the module to bot design programming interface manager 1002 to obtain the utterance from the developer. In another example, the parameter for the module may be a customized condition based on which the virtual agent performs an action associated with the module. In this manner, virtual agent module determiner 1006 may generate and store customized modules in virtual agent module database 1010 for future use. Virtual agent module determiner 1006 may retrieve and send modules to visual input-based program integrator 1012 for program integration.

The developer may instruct virtual agent development engine 170 to integrate the specified and customized modules to generate a customized virtual agent. Virtual agent development engine 170 also enables developer testing of the customized virtual agent after integration.

Visual input-based program integrator 1012 performs the integration. For each module to be integrated, visual input-based program integrator 1012 may retrieve program source code for the module from virtual agent program database 1014. For modules that have parameters customized based on developer input, visual input-based program integrator 1012 may modify the source code according to the customized parameters. In one embodiment, visual input-based program integrator 1012 may invoke machine-learning engine 1016 to further modify the source code using machine learning. For example, machine-learning engine 1016 may extend the source code to include more parameter values. For example, in a module of a weather agent that collects information about a city for which weather is queried, the developer may enter several exemplary city names. Thereafter, machine learning engine 1016 may obtain training data from training database 1018 and modify the source code to adapt to city names in like manner to the cities in the developer's examples. In one embodiment, for example, administrator 1020 of virtual agent development engine 170 may seed initial data in training database 1018 and virtual agent module database 1010 based on previous actual user-agent conversations and common virtual agent modules, respectively. Machine learning engine 1016 may send machine-learned source codes of the customized modules to visual input-based program integrator 1012 for integration into the customized virtual agent.

In one embodiment, visual input-based program integrator 1012 may also obtain information from program development status file 1008 to refine the source codes based on the development status recorded for the virtual agent. After generating the customized virtual agent, visual input-based program integrator 1012 may send the customized virtual agent to the developer. In addition, visual input-based program integrator 1012 may store the customized virtual agent and any related customized task information into customized task database 139. The customized virtual agent may be stored as a template, for example, to allow a developer to later use in developing a different but similar virtual agent. Bot design programming interface manager 1002 may present the template to the developer as a separate instance for each virtual agent to be developed, thereby enabling the developer to develop like virtual agents by merely modifying necessary parameters, or otherwise minimal customization.

One example of template use is a trigger module that may be customized by associating the module with a specific utterance that invokes a related task (e.g., to book a flight). When the specific utterance (or a variation of one or more utterance) is detected in a dialog with a chat user, the related task is invoked, which may include, for example, conducting a structured dialog between the virtual agent and the chat user and carrying out an action that depends on information collected from the chat user in the structured dialog.

Figure 2A:
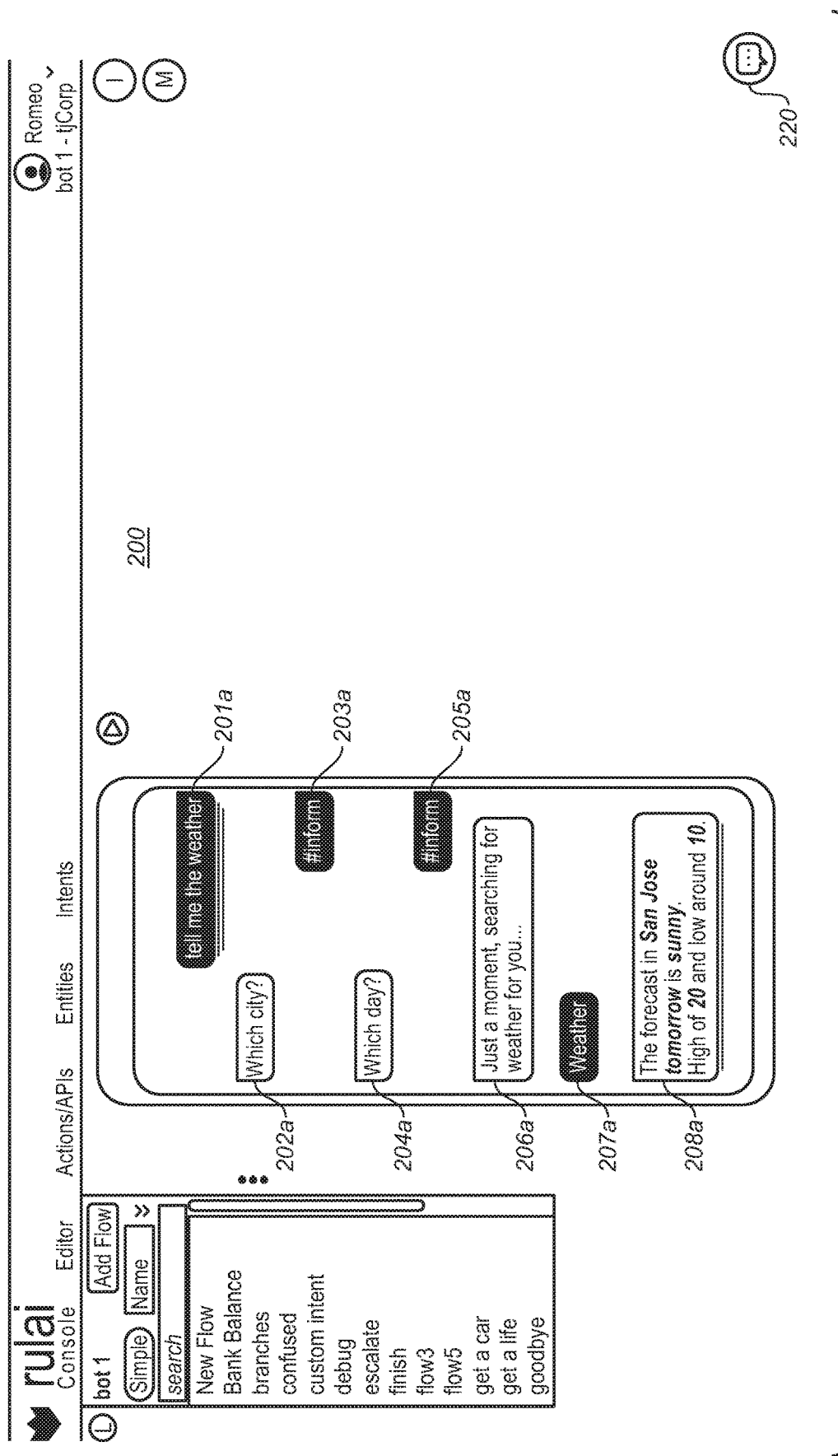
FIG. 2(a) illustrates exemplary custom task flow 200 in a virtual agent specified by a developer on a design console served by bot design programming interface 1002 of FIG. 1, according to one embodiment of the present invention.

FIG. 2(a) illustrates exemplary task flow 200 in a virtual agent specified by a developer on a design console served by bot design programming interface 1002, according to one embodiment of the present invention. As shown in FIG. 2(a), the design console provides the developer a visual programming interface to specify the elements of custom task flow 200 in a chat session between the virtual agent and a chat user. In FIG. 2(a), the visual programming interface or design console is presented in simulated mobile telephone screen to illustrate the interactions in the chat session. For example, messages specified to be displayed to a user (e.g., messages 202-a, 204-a, 206-a and 208-a) are presented on the left side of the screen, while each action to be taken by the virtual agent (e.g., actions 201-a. 203-a, or 205-a) which operates on a chat user input is placed on the right side of the screen. In an actual chat session, the chat user input would appear on the mobile telephone screen where the corresponding virtual agent action is shown in FIG. 2(a). Virtual agent action not operating on a chat user input (e.g., action 207-a) is placed on the left side of the mobile telephone screen. (In this detailed description, the display on a mobile device screen is merely used as a visual example of one possible end product in a suitable application; any custom task flow defined using the design console may be implemented in any medium, such as within a browser running on a desk-top computer, for example, or in an app running a mobile device.)

As shown in FIG. 2(a), action 201-a specifies conditions for triggering custom task flow 200, which relates to delivering a weather forecast to the chat user. In this example, custom task flow 200 is based on a task-oriented dialog between a virtual agent and a chat user. Custom task flow 200 is triggered when a chat user utters "tell me the weather." Current flow 200 can also be triggered by any of a number of similar utterances that indicate that the chat user is inquiring about the weather, such as: (a) "What's the weather?"; (b) "What's the weather like in San Jose?": (c) "How's the weather in San Jose?": and (d) "Is it raining in Cupertino?". The developer can include in custom task flow 200 additional triggering utterances by clicking on element 201-a. Clicking on element 201-a brings up a dialog box that allows further specification of triggering utterances (see, e.g., FIG. 3(c) below). As discussed herein, virtual agent development engine 170 may utilize machine learning techniques to generate a list of additional similar utterances that the chat user may say to trigger custom task flow 200. The virtual agent may conduct this task-oriented dialog to gather information needed to provide the weather forecast sought by the chat user.

Figure 2B:
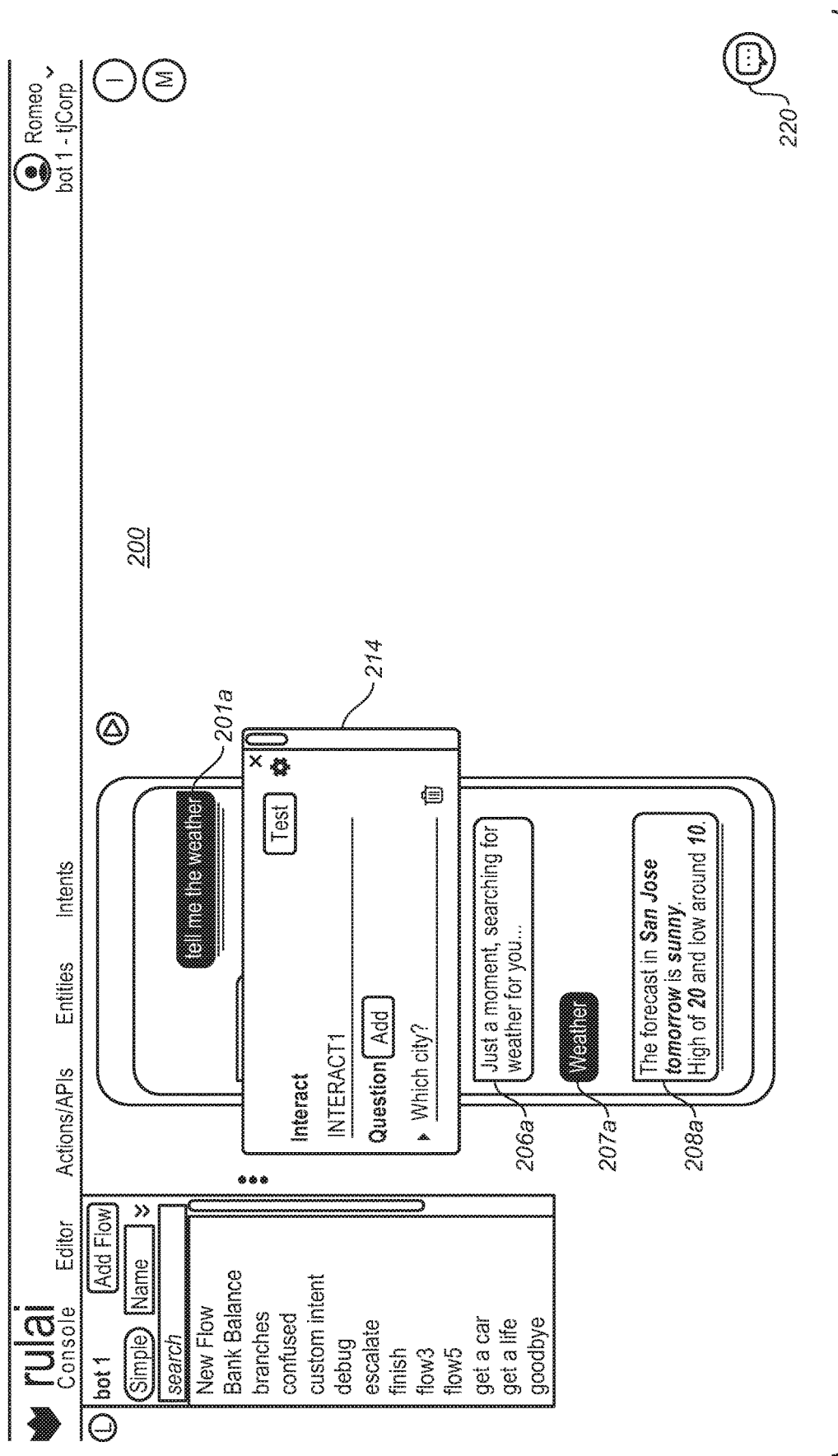
FIG. 2(b) shows dialog box 214 which allow the developer to customize an interaction module of custom task flow 200 in the virtual agent by specifying the content of message 202-a and the type of data (e.g., by way of example) to be collected.

In custom task flow 200, the developer has determined that, to provide a weather forecast, data values of a "city" parameter and a "day" parameter are required to be collected from the chat user. Message 202-a and action 203-a are elements of a data collection or "interaction" module that collects the data value for the "city" parameter, by displaying the question "which city?" which prompts the chat user to respond by an utterance from which the data value for the "city" parameter may be extracted. FIG. 2(b) shows dialog box 214 which allow the developer to customize an interaction module of custom task flow 200 in the virtual agent by specifying the content of message 202-a and the type of data (e.g., by way of example) to be collected for the "city" parameter. Dialog box 214 is brought up in the design console clicking on message element 202-a or action element 203-a. Likewise, an interaction module is customized to allow the developer by specifying the content of message 204-a (i.e., "Which day?") and the type of data (e.g., a specification of date, by way of example) to be collected for the "day" parameter.

Figure 2C:
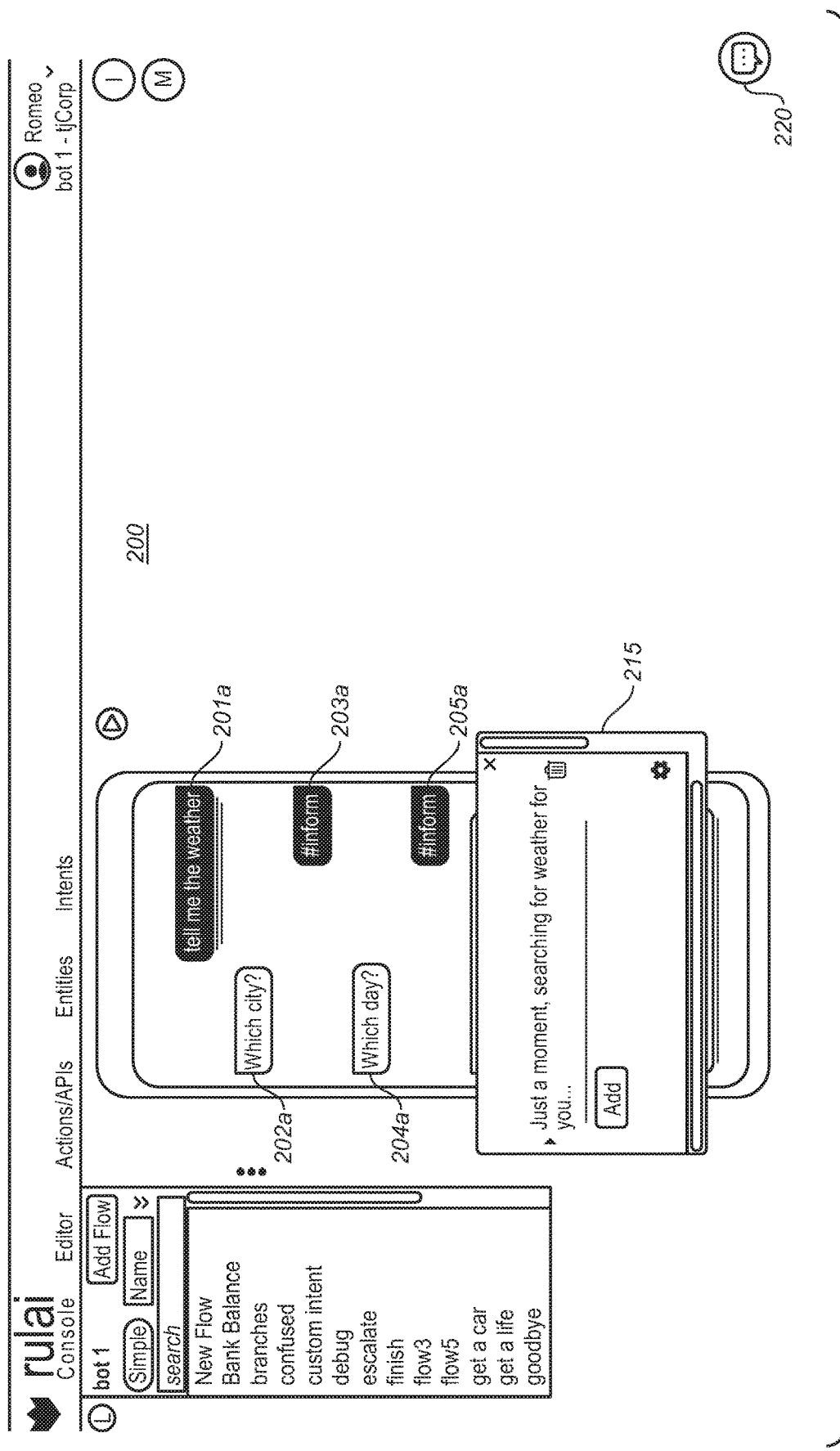
FIG. 2(c) shows dialog box 215 for a message module in custom task flow 200 of FIG. 1(a); dialog box 215 allows the developer to specify a message for the message module to send to the chat user.

FIG. 2(c) shows dialog box 215 for a message module in custom task flow 200; dialog box 215 allows the developer to specify a message for the message module to send to the chat user.

With respect to the triggering conditions, the utterances that trigger custom task flow 200 of FIG. 2(a) may already include a data value for at least one of the two parameters (i.e., the "city" and the "day" parameters). For example, the utterance, "What's the weather like in San Jose?" includes both "weather." which triggers the current flow, and "San Jose." which may serve as the data value for the "city" parameter. The design console of the present invention allows the developer to place conditions on the customized interaction modules in custom task flow 200. One example of such conditions includes suppressing invocation of an interaction module when the data value for the corresponding parameter (i.e., the "city" or the "day" parameter) has already been obtained.

Figure 2D:
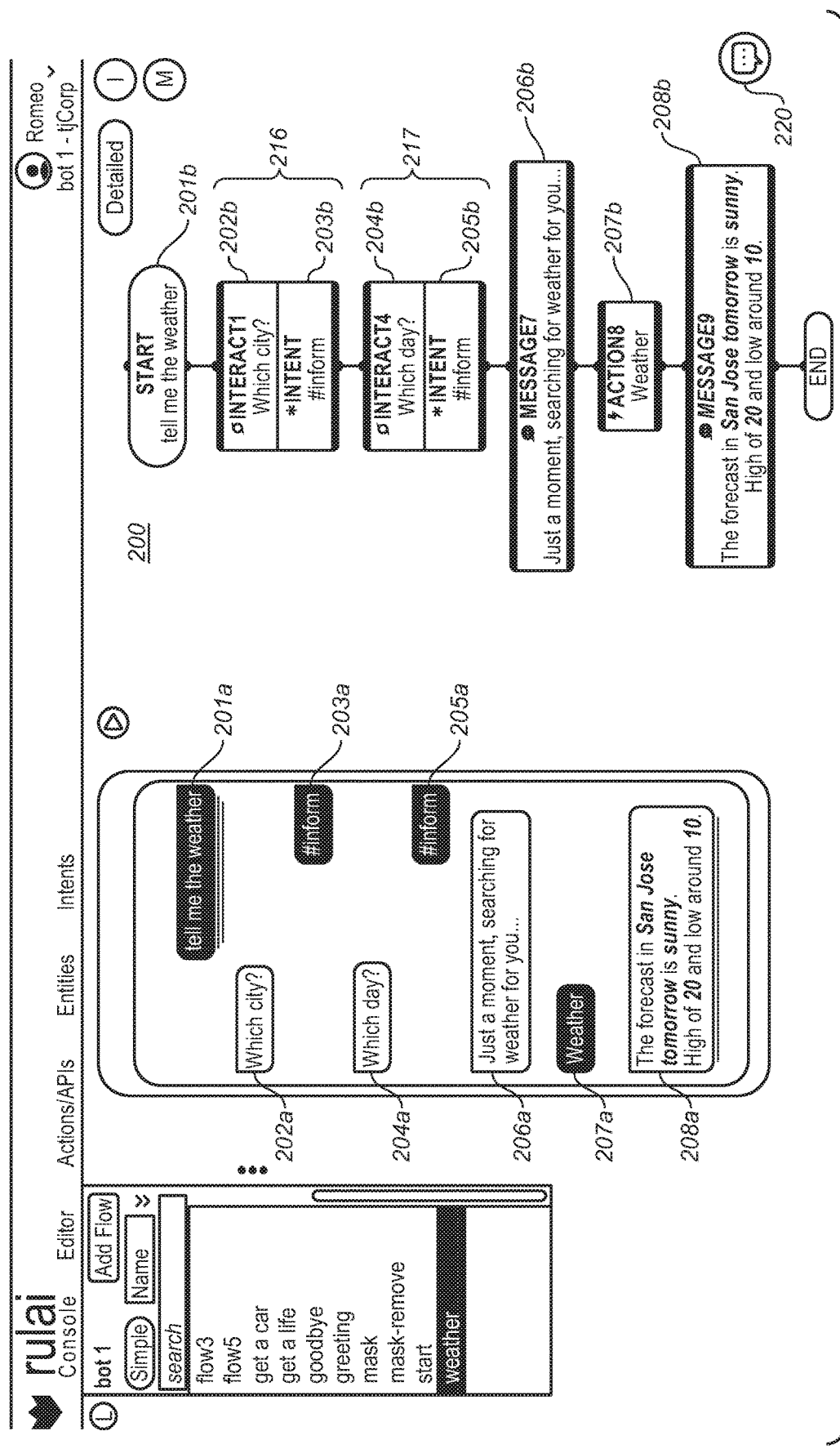
FIG. 2(d) shows the design console presenting custom task flow 200 of FIG. 2(a) in a flow chart displayed next to the graphical image of the mobile telephone screen.

In some embodiments, the design console may present custom task flow 200 in an alternative format, such as a flow chart. (While it is possible to develop a virtual agent through manipulation of the intended dialog in the graphical image of the end product without using the flow chart, being able to operate on the claim chart as a supplementary modality provides greater flexibility to the developer.) FIG. 2(d) shows the design console presenting custom task flow 200 of FIG. 2(a) in a flow chart displayed next to the graphical image of the mobile telephone screen. The flow chart of FIG. 2(d) shows, in the order of execution specified by the developer. (A) triggering module 291-b; (B) interaction modules 216 and 217, having (i) message presentation elements 202-b and 204-b, respectively customized to present messages "Which city?" and "Which day?", and (ii) action elements 203-b and 205-b, respectively customized to extract the data values for the "city" and "day" parameters; (C) message module 206-b, customized to present the message "just a moment, searching . . . " to the chat user; (D) action module 207-b, customized to retrieve the weather information from a relevant source, based on the data values of the "city" and "day" parameters; and (E) message module 208-b, customized to present the retrieved weather information to the chat user. In some embodiment, the developer may point-and-click modules on the flow chart to perform any edit function on the elements of custom task flow 200, in like manner as operating on the graphical image of the mobile device screen.

Figure 2E:
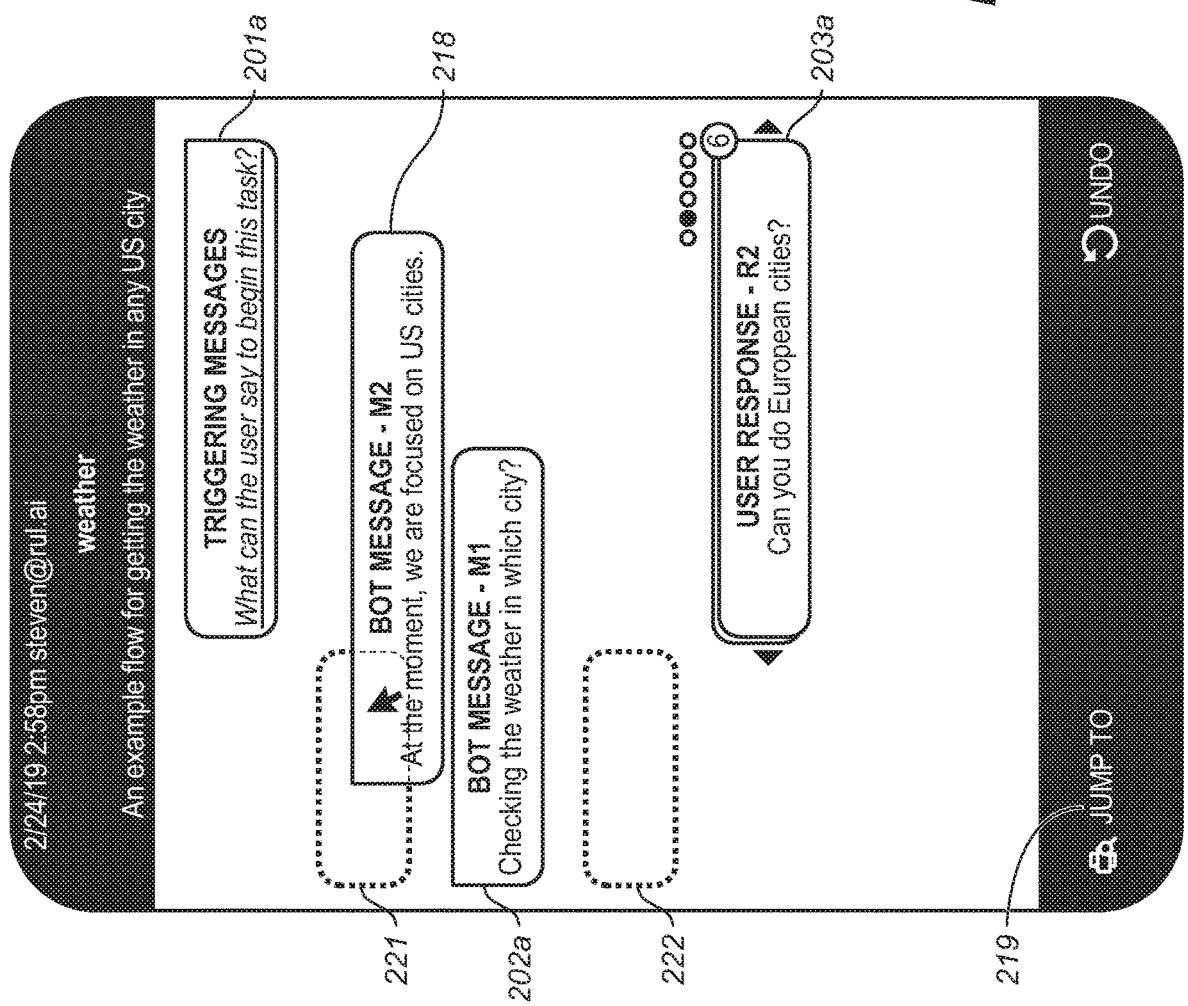
FIG. 2(e) illustrates placing message element 218 to one of available locations 221 and 222, using a familiar "drag and drop" maneuver known to those familiar with a graphical user interface.
Figure 2F:
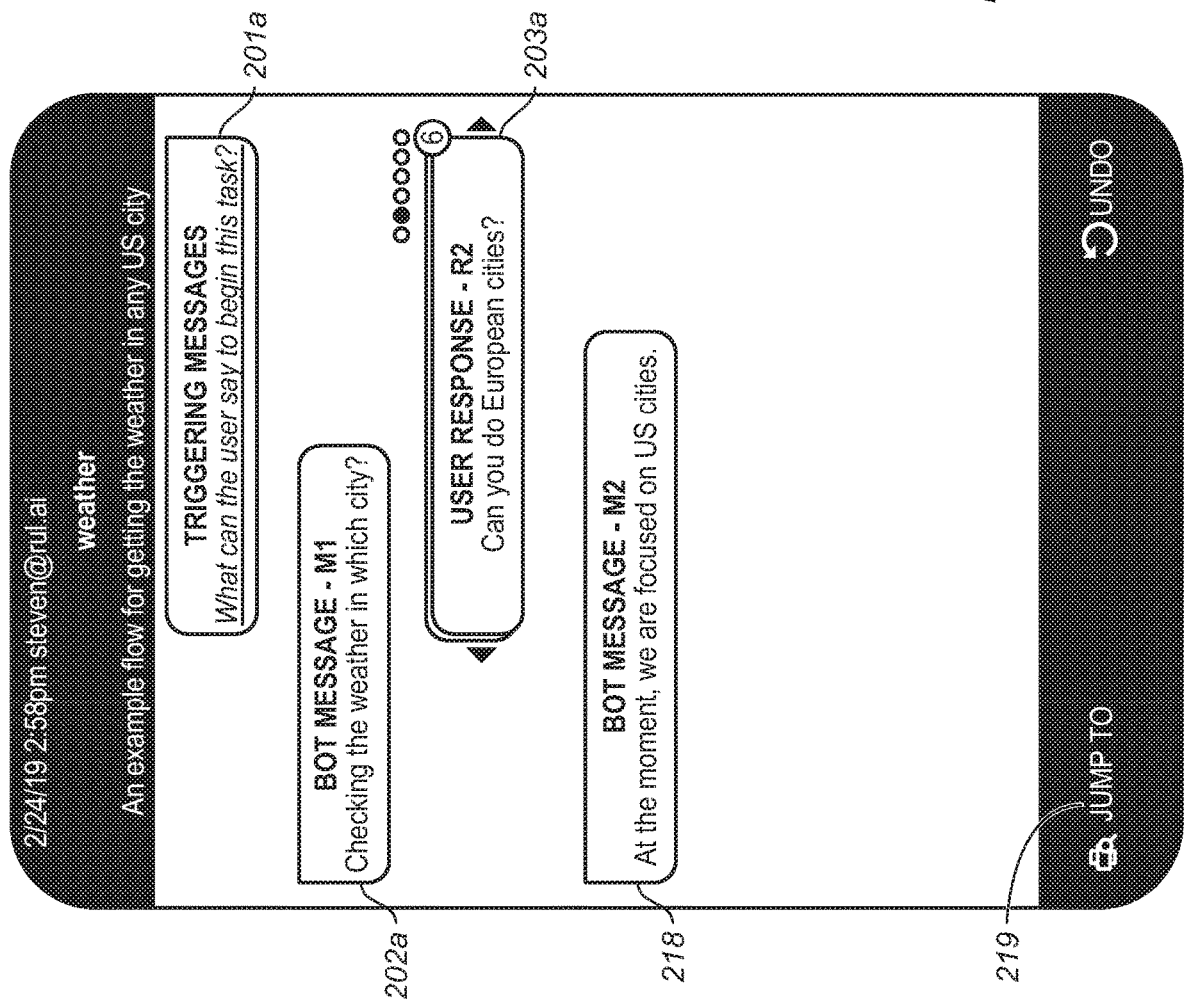
FIGS. 2(f) and 2(g) illustrate an implementation that allows the developer to create, edit and view the different conversation threads.
Figure 2G:
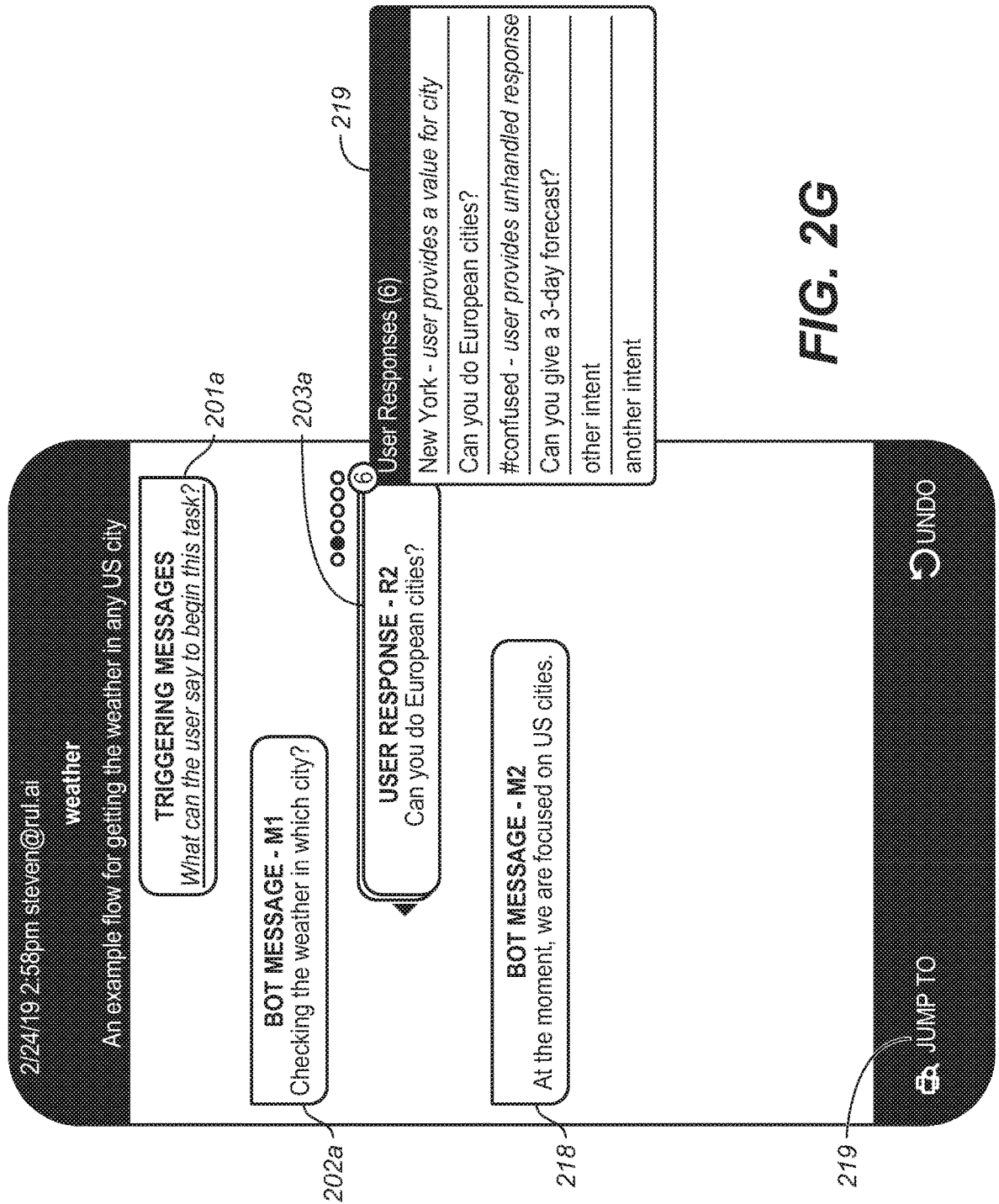

The design console allows the developer to directly edit the elements of custom task flow 200 in the graphical image of target medium of presentation (i.e., in FIGS. 2(a)-2(c), the mobile device screen). Other examples of direct manipulation are illustrated in FIGS. 2(e)-2(g). FIG. 2(e) illustrates placing message element 218 to one of available locations 221 and 222, using a familiar "drag and drop" maneuver known to those familiar with a graphical user interface. Other supported operations include adding, removing, or moving (e.g., changing the order of execution) elements through direct manipulation on the graphical image.

In a natural language conversation between a virtual agent and a user, the user often responds to a question by the virtual agent in one of multiple ways. For example, in the weather forecast retrieval operation illustrated in FIG. 2(a), the user may respond to the virtual agent's utterance, "Which City?" by asking the question "Can you do European cities?" rather than responding with the name of a city. Often, rather than answering the virtual agent's question, the user may digress. Each of these situations may requiring detecting a different user intent and may require the virtual agent to take a different action. In practical terms, custom task flow 200 has multiple conversational threads. FIGS. 2(f) and 2(g) illustrate an implementation that allows the developer to create, edit and view the different conversation threads. As shown in FIG. 2(f), the numeral "6" indicates that action 203-a is a branching point to six conversational threads. Displayed on the icon of action 203-a is the text "Can you do European cities?" indicating the currently displayed conversational thread handles the situation when a user inputs a foreign city or inquire about a foreign city. Displayed next to action 203-a are "scroll left" and "scroll right" icons which allow the developer to move to other conversational threads branching out from the current user input point in the intended dialog. Alternatively, the developer may click on the icon of action 203-a to obtain a "drop-down" menu to view and to select for edit the various conversational threads branching out from the current user input point, as illustrated in FIG. 2(g).

The design console provides a test capability that allows the chat session defined by custom task flow 200 to be run for testing purpose. The developer may run the chat session under development by selecting icon or virtual button 220.

As shown in each of FIGS. 2(e)-2(g), icon 219 bearing the legend "jump to" in the graphical image of the end product allows the developer to access any element in any conversational thread in custom task flow 200 using, for example, a search query. A similar capability is provided in the simulated chat session. The developer can access any element in any conversational thread of the custom task flow by clicking on virtual agent utterances or user utterances. In addition, the developer may access any element of a custom task flow through selections from a menu, a link in the simulated chat simulation, or from the flow chart view. When the developer accesses any element using any of these devices, the design console high lights the element in the flow chart view and brings the requested element into the graphical image of the target medium of presentation, together with its context in the custom task.

Figure 3A:
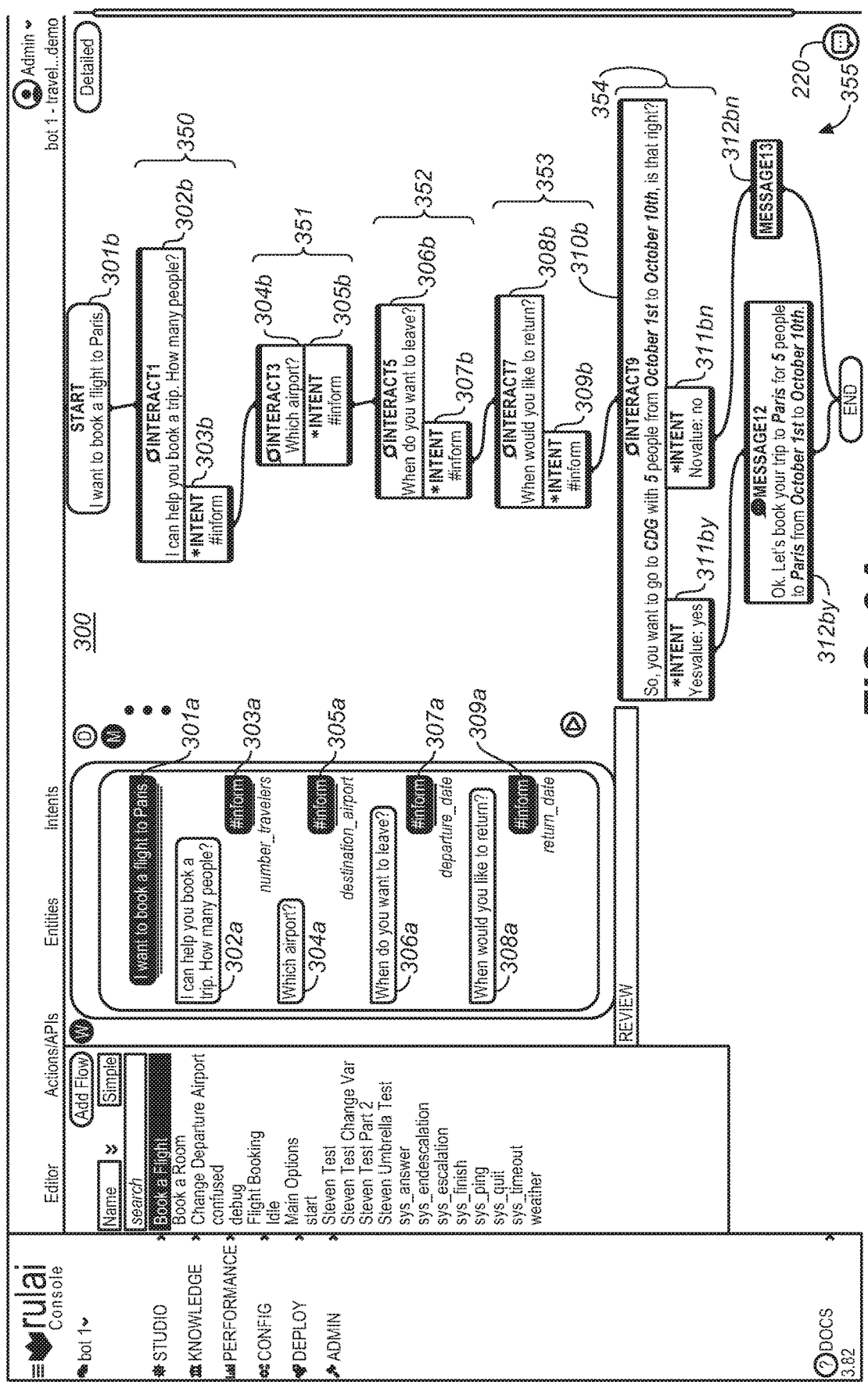
FIGS. 3(a) and 3(b) show custom task flow 300 in a virtual agent presented in a design console for developer specification, according to an embodiment of the present teaching.
Figure 3B:
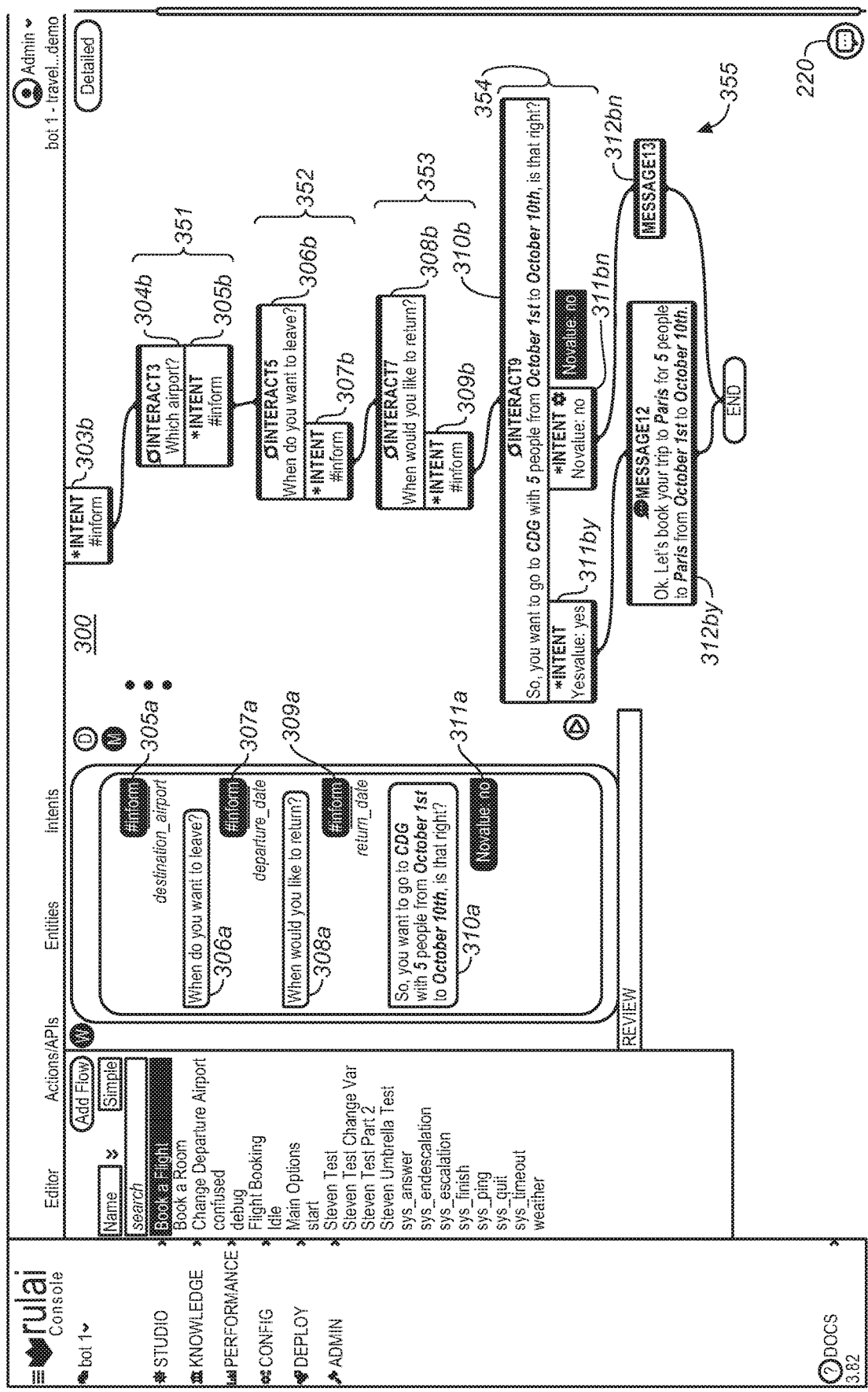
Figure 3C:
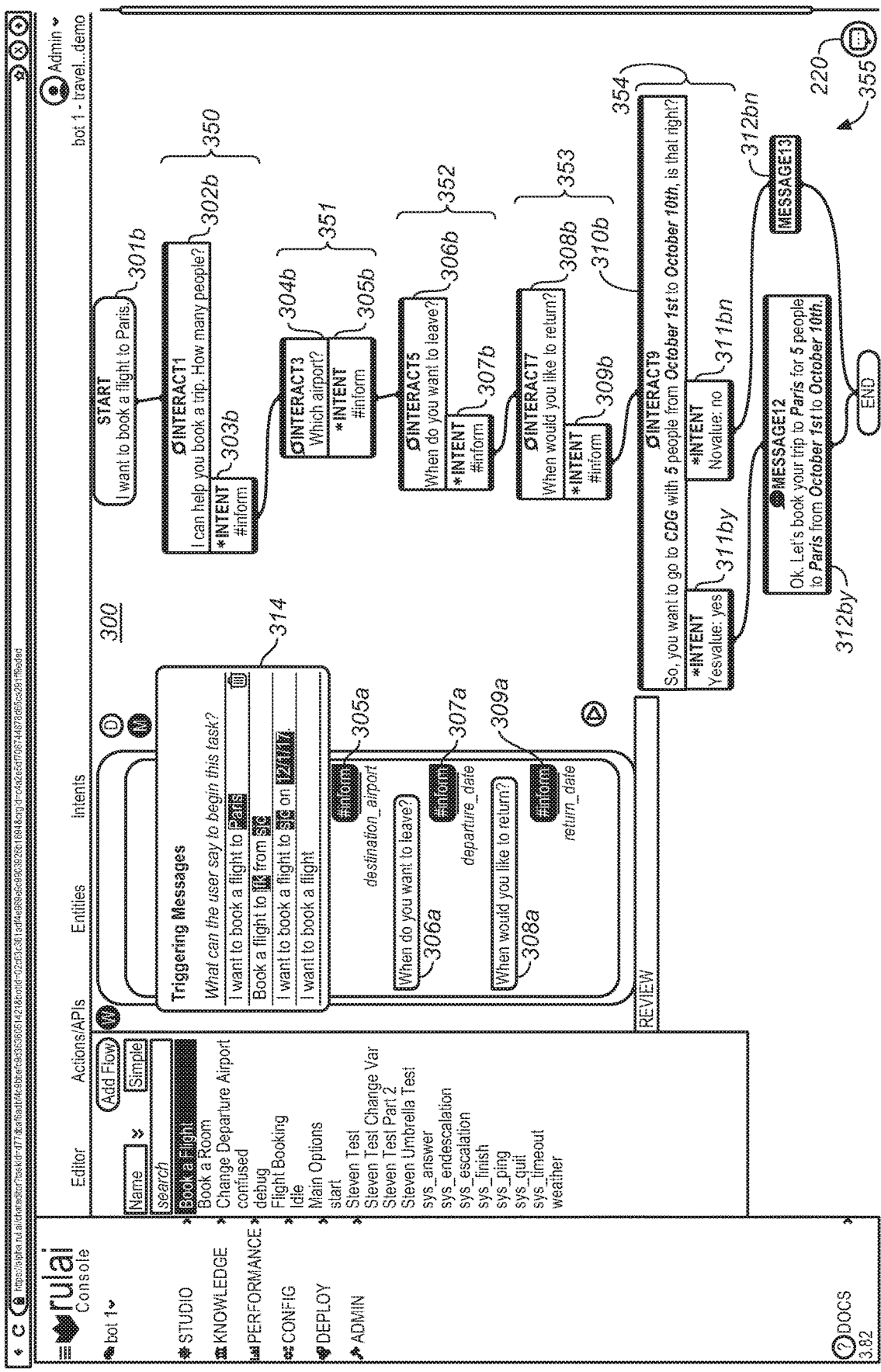
FIG. 3(c) shows dialog box 314 that is brought up when the developer clicks on trigger element 301-a of custom task flow 300 in the graphical image of the mobile telephone screen.
Figure 3D:
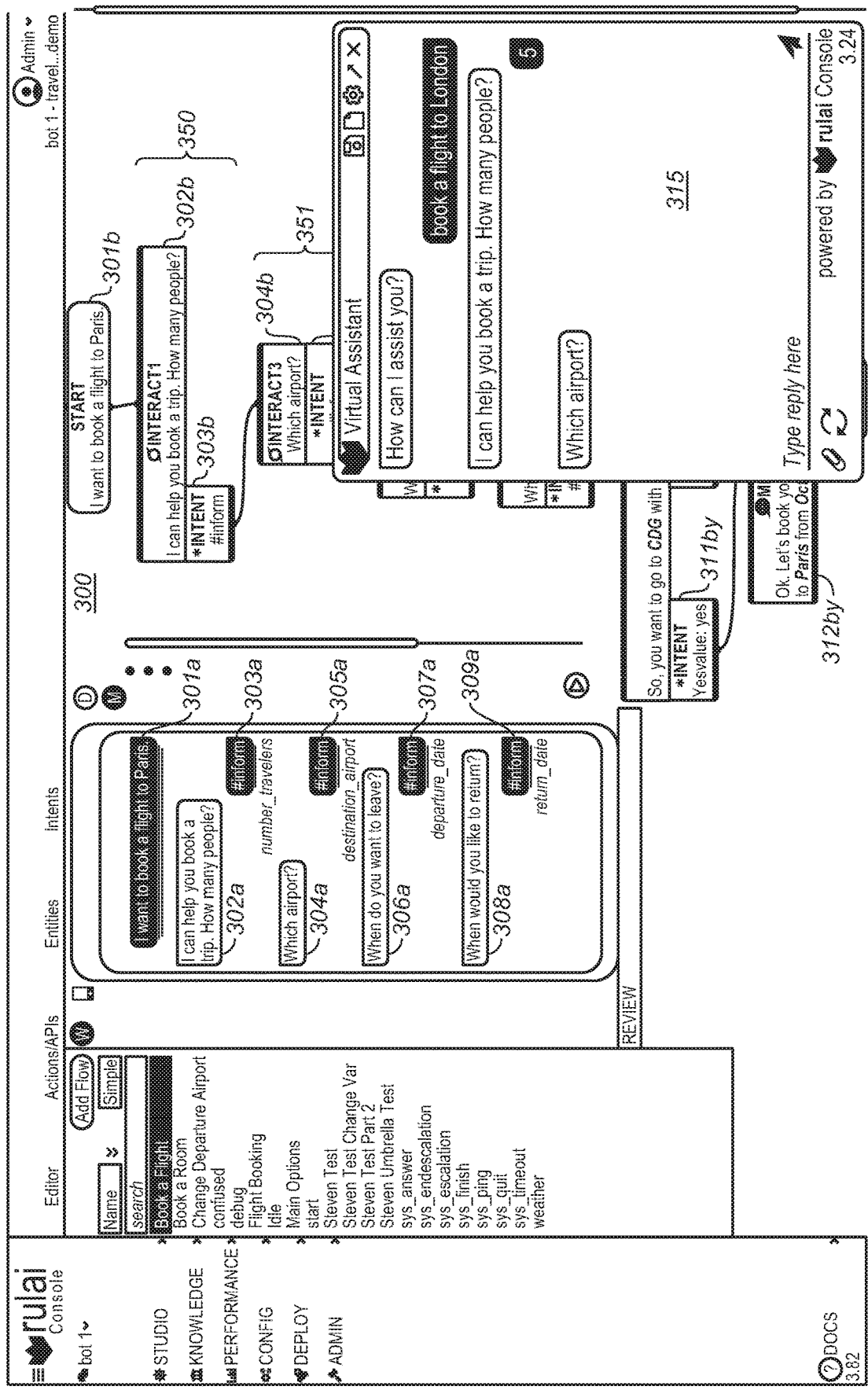
FIG. 3(d) shows, when a developer selects virtual button 220 from the design console, a virtual agent is activated to execute a chat session based on the custom task flow in the design console, showing in window or viewport 315 the resulting dialog between the virtual agent and the chat user (in this case the developer).

FIGS. 3(a) and 3(b) show custom task flow 300 in a virtual agent presented in a design console for developer specification, according to an embodiment of the present teaching. FIG. 3(a) shows in the graphical image of the mobile telephone screen an initial portion of custom task flow 300, while FIG. 3(b) shows in the graphical image of the mobile telephone screen the remainder of the custom task flow 300, revealed by scrolling down the mobile telephone screen. FIG. 3(a) shows trigger element 301-a and four interaction modules represented by message element-action element pairs (302-a, 303-a), (304-a, 305-a), (306-a. 307-a) and (308-a. 309-a). FIG. 3(b) shows the last interaction module represented by message element-action element pair (310-a and 311-a). FIG. 3(a) also shows the alternative representation of custom task flow 300 in the form of a flow chart, which comprises trigger module 301-b, interaction modules 350-354 and message modules 312-bY and 312-bN. Note that interaction module 354 expects to receive from the chat user an utterance that indicates either an affirmative response (e.g., "Yes") or a negative response (e.g., "No"). According to whether the response is affirmative or negative, the virtual agent executes message module 312-bY or message module 312-bN, respectively.

As shown in FIG. 3(a) custom task flow 300 includes in the flow chart also interactive modules 350-354 represented respectively by message element-action element pairs (302-b. 303-b), (304-b, 305-b). (306-b. 307-b) and (308-b, 309-b), which correspond to message element-action element pairs (302-a. 303-a), (304-a. 305-a), (306-a. 307-a) and (308-a. 309-a) displayed on the graphical image of the mobile telephone screen. Message elements 302-a, 304-a. 306-a and 308-a display messages " . . . . How many people?", "Which airport?", "When do you want to leave?" and "When would you like to return?" These messages prompt the user to provide responses from which "number of tickets". "airport", "departure date" and "return date" parameters may be extracted.

The two simultaneous, alternative visual presentations (i.e., the mobile telephone screen and the flow chart) by the design console provide the developer a coordinated visual design environment, providing the attendant advantages of both approaches. When the developer selects for edit an element in the mobile telephone screen (e.g., message element 308-a, "When would you return?"), the corresponding element in the flow chart (e.g., message element 308-*b* of interaction module 354) component is also activated—i.e., indicated by highlight, such as a designated color, texture or shade, or shadow—as being selected for edit. In this manner, the developer is provided a visual environment that provides the benefits of both visual design approaches. The mobile telephone screen provides the view into what the chat user would see, while the flow chart provides an overview of the organization and logic of the custom task flow. A developer is readily informed of which part, interaction or component of the intended dialog is being reviewed and edited, while being facilitated in navigating to other elements of the custom task, all the time having the "whole picture" of the intended dialog structure in visual view. In this manner, the develop may select, zoom into and edit with ease any element of the intended dialog concurrently in both the simulation view (i.e., the simulated mobile telephone screen) and the flow chart view, guided by activation and highlighting of the corresponding elements and in the context and perspective of the entire organization of the intended dialog and the related business logic.

In custom task flow 300, trigger element 301-*a* defines the utterances that trigger custom task flow 300. FIG. 3(*c*) shows dialog box 314 that is brought up when the developer clicks on trigger element 301-*a* of custom task flow 300 in the graphical image of the mobile telephone screen. As shown in FIG. 3(*a*), dialog box 314 allows the developer to add an additional triggering utterance, while displaying the utterances already incorporated: "I need to book a flight to Paris," "Book a flight to jfk from sjc," "I want to book a flight to sjc on 12/1/17," and "I want to book a flight." The developer may add, delete or modify any of the trigger messages.

As mentioned above, the design console of the present invention allows the developer to test the defined custom task flow. FIG. 3(*d*) shows, when a developer selects virtual button 220 from the design console, a virtual agent is activated to execute a chat session based on the custom task flow in the design console, showing in window or viewport 315 the resulting dialog between the virtual agent and the chat user (in this case the developer).

Although the design console of the present invention is illustrated in the detailed description above by way of a task flow, the design console may be used to defined other applications involving interactions or conversations (e.g., in a chat environment) between a virtual agent and a user. Some examples include handling data-base queries and question-answer interactions based on knowledge graphs or based on frequently answered question (FAQ).

The above detailed description is provided to illustrate specific embodiments of the present invention and is not intended to be limiting. Numerous modifications and variations within the scope of the invention are possible. The present invention is set forth in the accompanying claims.

We claim:

1. A design console for interaction with a developer in a graphical interface of a virtual agent programming system, comprising a graphical image of a target medium of presentation, showing elements of an intended dialog between the virtual agent and a chat user, wherein the elements of intended dialog comprise:
    a trigger element representing a module which processes input messages from the chat user and which detects from the input messages processed an intent by the chat user to invoke the virtual agent based on one or more stored utterances;
    one or more interaction elements, each interaction element representing an interaction module which (i) sends a virtual agent message to the chat user, (ii) receives from the chat user an utterance responsive to the virtual agent message, and (iii) determines the responsive utterance the value of a parameter of a specified user intent, wherein each interaction element is shown on the graphical image of the target medium of presentation as (i) a virtual agent utterance and (ii) a chat user utterance; and
    an action element representing a module that carries out the specified user intent based on the values of the parameters collected from the chat user through the interaction module.

2. The design console of claim 1, wherein the target medium of presentation comprises a screen of a mobile device.

3. The design console of claim 1, wherein the graphical interface enables the developer, using direct manipulations on the graphical image, to add, delete and edit any element of the intended dialog, or to modify the position in the intended dialog the element appears.

4. The design console of claim 3, wherein the direct manipulation includes interaction between the developer and the design through using a dialog box.

5. The design console of claim 1, wherein the intended dialog comprises a plurality of conversational threads based on detecting user intent from one or more of the responsive utterances.

6. The design console of claim 5, wherein the graphical interface enables the developer, using direct manipulation in the graphical image, to access each conversational thread of the intended dialog.

7. The design console of claim 6, wherein the direct manipulation comprises a scrolling operation or a selection operation from a menu.

8. The design console of claim 5, wherein the graphical interface provides a search capability for the developer to access any element in any conversational thread of the intended dialog.

9. The design console of claim 1, wherein the graphical interface enables the developer to activate a simulation of the intended dialog.

10. The design console of claim 9, wherein utterances generated from the simulation of the intended dialog are displayed on a viewport of the graphical interface.

11. The design console of claim 10, wherein the graphical interface allows the developer to inspect any corresponding element of any utterance generated in the simulation displayed in the viewport.

12. The design console of claim 1, wherein the elements of the intended dialog represent a task flow.

13. The design console of claim 12, wherein the design console further represents the task flow by a flow chart.

14. The design console of claim 13, wherein the graphical interface allows the developer to edit the flow chart by direct manipulation.

15. The design console of claim 13, wherein the graphical interface enables the developer, using direct manipulations on the graphical image or on the flow chart, to add, delete and edit any element of the intended dialog, or to modify the position in the intended dialog the element appears.

16. The design console of claim 15, wherein corresponding elements of the task flow in both the graphical image of the target medium of presentation and the flow chart are activated to allowing editing when the developer selects either one of the corresponding elements.

17. The design console of claim 16, wherein, when the developer selects either one of the corresponding elements, the other one of the corresponding elements is highlighted to indicate that it is concurrently selected.

18. The design console of claim 17, wherein the graphical interface highlighting both corresponding elements by one or more of: color, texture and shadow.

19. The design console of claim 13, wherein the flow chart represents a business logic embedded in the task flow.

20. The design console of claim 1, wherein the virtual agent utterances are displayed at positions of the target medium of presentation designated for indicating that the virtual agent utterances are sent from the virtual agent.

21. The design console of claim 1, wherein the chat user utterances are displayed at positions of the target medium of presentation designated for indicating that the chat user utterances are sent from the chat user.

22. A method for providing a design console for interaction with a developer in a graphical interface of a virtual agent programming system, the design console comprising a graphical image of a target medium of presentation showing elements of an intended dialog between the virtual agent and a chat user, wherein the method comprises:
 providing a trigger element in the elements of the intended dialog, the trigger element representing a module which processes input messages from the chat user and which detects from the input messages processed an intent by the chat user to invoke the virtual agent based on one or more stored utterances;
 providing one or more interaction elements in the elements of the intended dialog, each interaction element representing an interaction module which (i) sends a virtual agent message to the chat user, (ii) receives from the chat user an utterance responsive to the virtual agent message, and (iii) determines the responsive utterance the value of a parameter of a specified user intent, wherein each interaction element is shown on the graphical image of the target medium of presentation as (i) a virtual agent utterance and (ii) a chat user utterance; and
 providing an action element in the elements of the intended dialog, the action element representing a module that carries out the specified user intent based on the values of the parameters collected from the chat user through the interaction module.

23. The method of claim 22, wherein the target medium of presentation comprises a screen of a mobile device.

24. The method of claim 22, wherein the graphical interface enables the developer, using direct manipulations on the graphical image, to add, delete and edit any element of the intended dialog, or to modify the position in the intended dialog the element appears.

25. The method of claim 24, wherein the direct manipulation includes interaction between the developer and the design through using a dialog box.

26. The method of claim 22, wherein the intended dialog comprises a plurality of conversational threads based on detecting user intent from one or more of the responsive utterances.

27. The method of claim 26, wherein the graphical interface enables the developer, using direct manipulation in the graphical image, to access each conversational thread of the intended dialog.

28. The method of claim 27, wherein the direct manipulation comprises a scrolling operation or a selection operation from a menu.

29. The method of claim 26, wherein the graphical interface provides a search capability for the developer to access any element in any conversational thread of the intended dialog.

30. The method of claim 22, wherein the graphical interface enables the developer to activate a simulation of the intended dialog.

31. The method of claim 30, wherein utterances generated from the simulation of the intended dialog are displayed on a viewport of the graphical interface.

32. The method of claim 31, wherein the graphical interface allows the developer to inspect any corresponding element of any utterance generated in the simulation displayed in the viewport.

33. The method of claim 22, wherein the elements of the intended dialog represent a task flow.

34. The method of claim 33, wherein the design console further represents the task flow by a flow chart.

35. The method of claim 34, wherein the graphical interface allows the developer to edit the flow chart by direct manipulation.

36. The method of claim 35, wherein the graphical interface enables the developer, using direct manipulations on the graphical image or on the flow chart, to add, delete and edit any element of the intended dialog, or to modify the position in the intended dialog the element appears.

37. The method of claim 36, wherein corresponding elements of the task flow in both the graphical image of the target medium of presentation and the flow chart are activated to allowing editing when the developer selects either one of the corresponding elements.

38. The method of claim 37, wherein, when the developer selects either one of the corresponding elements, the other one of the corresponding elements is highlighted to indicate that it is concurrently selected.

39. The method of claim 38, wherein the graphical interface highlighting both corresponding elements by one or more of: color, texture and shadow.

40. The method of claim 34, wherein the flow chart represents a business logic embedded in the task flow.

41. The method of claim 22, wherein the virtual agent utterances are displayed at positions of the target medium of presentation designated for indicating that the virtual agent utterances are sent from the virtual agent.

42. The method of claim 22, wherein the chat user utterances are displayed at positions of the target medium of presentation designated for indicating that the chat user utterances are sent from the chat user.

* * * * *